United States Patent [19]

Wichterle et al.

[11] Patent Number: 4,568,501

[45] Date of Patent: Feb. 4, 1986

[54] METHOD AND APPARATUS WITH AUTOMATIC FEED MEANS FOR CENTRIFUGALLY CASTING ARTICLES

[75] Inventors: Otto Wichterle; Jiri Vodnansky, both of Prague; Vladimir Havlin, Roztoky u Prahy, all of Czechoslovakia

[73] Assignee: Ceskoslovenska Akademie Ved, Prague, Czechoslovakia

[21] Appl. No.: 597,309

[22] Filed: Apr. 6, 1984

[30] Foreign Application Priority Data

May 23, 1983 [CS] Czechoslovakia .............. 3613-83

[51] Int. Cl.[4] .............................................. B29D 11/00
[52] U.S. Cl. ......................................... 264/2.1; 65/302; 264/297.6; 264/297.8; 264/311; 425/434; 425/808
[58] Field of Search ................ 264/2.1, 311, 297.6, 264/297.8; 425/259, 261, 425, 434, 126 R, 808, 809; 221/285; 65/71, 302

[56] References Cited

U.S. PATENT DOCUMENTS

| | | | |
|---|---|---|---|
| 1,446,041 | 2/1923 | Graves | 425/126 R |
| 1,626,914 | 5/1927 | Brown | 425/126 R |
| 2,491,573 | 12/1949 | McPherson | 221/285 |
| 2,751,113 | 6/1956 | Neyses | 221/285 |
| 3,046,600 | 7/1962 | Linhorst . | |
| 3,107,141 | 10/1963 | Crafton . | |
| 3,165,565 | 1/1965 | Cox et al. . | |
| 3,263,860 | 8/1966 | Haas | 221/285 |
| 3,290,423 | 11/1962 | Hatch et al. . | |
| 3,303,256 | 2/1967 | Morin | 425/126 R |
| 3,408,429 | 10/1968 | Wichterle . | |
| 3,660,545 | 5/1972 | Wichterle . | |
| 3,790,336 | 2/1974 | Brede, III et al. . | |
| 4,153,349 | 5/1979 | Wichterle . | |
| 4,207,044 | 6/1980 | Lionello | 425/126 R |
| 4,468,184 | 8/1984 | Rawlings | 425/434 |

FOREIGN PATENT DOCUMENTS 159359 4/1974 Czechoslovakia .

*Primary Examiner*—James Lowe
*Attorney, Agent, or Firm*—Vincent P. Pirri

[57] ABSTRACT

A centrifugal casting device employing a rotatable polymerization column adapted to accommodate a plurality of vertically aligned molds and a rotatable mold-dispensing magazine disposed at an angle α to the polymerization column and adapted to dispense molds one at a time into the polymerization column.

15 Claims, 2 Drawing Figures

U.S. Patent  Feb. 4, 1986  4,568,501
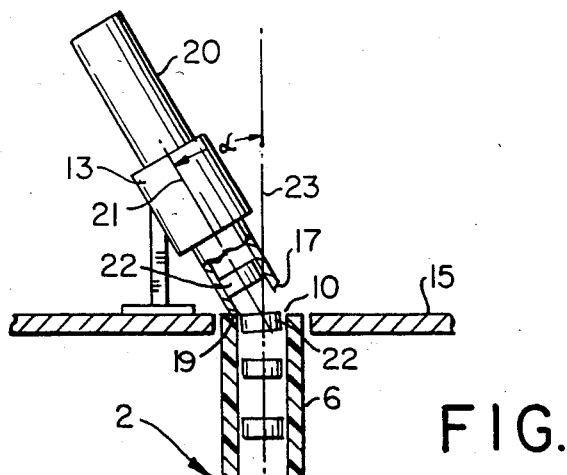
FIG. 1
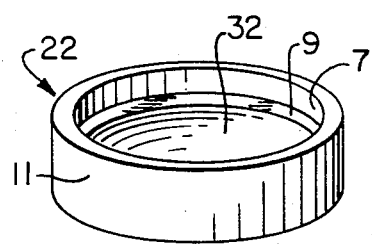
FIG. 2
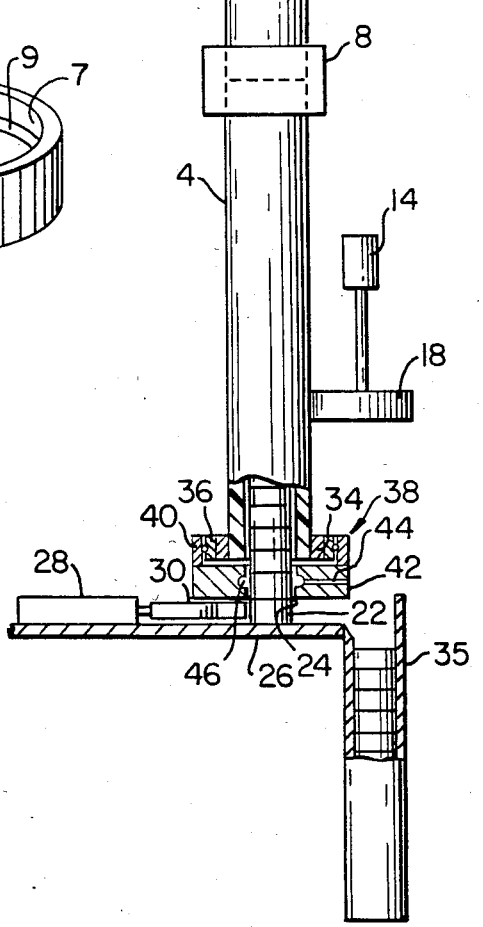

METHOD AND APPARATUS WITH AUTOMATIC FEED MEANS FOR CENTRIFUGALLY CASTING ARTICLES

DESCRIPTION

1. Technical Field

The present invention relates to a device for centrifugal casting of a plurality of objects such as lenses, disc valves, and the like. In one aspect, the present invention relates to a device employing a polymerization column adapted to accommodate a plurality of free falling molds in vertical alignment and having mold feeding means comprising a rotatable mold-dispensing magazine disposed proximal to the inlet end of the polymerization column and rotated at a speed sufficient to enable the molds to be individually ejected and gravity fed into the inlet end of said polymerization column.

2. Background Art

At present, centrifugal casting, such as polymerization-casting of axially symmetrical objects, such as, e.g. lenses, artificial heart valve substitutes, etc., can be preformed by several techniques.

One such technique utilized equipment wherein each rotating mold containing the polymerization reactants in the cavity thereof is adapted to rotate around their vertical axis. Rotation of each mold at a specifically determined speed creates a centrifugal force which causes the liquid reactants in the mold to generally assume the shape of the cavity of the mold that is contacted by the reactants. The molds can be grouped in linear array or alternatively can be assembled in carousel arrangement and individually rotated. This technique of operation along with various polymerizable compositions that can be used in the spin casting of various objects are disclosed in U.S. Pat. No. 3,660,545 issued on May 2, 1972. This disclosure is incorporated herein by reference as if set out in full text.

In another technique a rotatable polymerization tube is used which is adapted to receive a plurality of molds seated tightly to one another and each containing polymerizable reactants in the mold cavity. The molds are gravity fed into the upper end of the polymerization tube and free falls through the tube. The exit end of the tube is seated tightly on a revolving member which imparts rotation to the tube. An inert gas is fed upwards through the rotating polymerization tube about the free falling rotating molds.

OBJECTS OF THE INVENTION

One object of the invention is to provide mold feeding means for use with a polymerization column for centrifugally casting quality symmetrical or asymmetrical articles, such as lenses, on a continuous basis.

Another object of the present invention is to provide a centrifugal casting device employing a polymerization column adapted to accommodate a plurality of free falling molds in vertical alignment and employing automatic mold feeding means comprising a rotatable mold-dispensing means disposed proximal (including in communicating relationship with) the inlet end of the polymerization column and adapted for gravity feeding molds into the polymerization column one at a time.

A further object of the invention is to provide a method of producing contact lens in an efficient and reproducible manner.

The foregoing and additional objects will become full apparent from the following description and the accompanying drawings.

DISCLOSURE OF THE INVENTION

The invention relates to a device for casting articles comprising a rotatable polymerization column having an inlet end and an outlet end, said polymerization column adapted for rotation about a vertical axis and adapted for receiving, one at a time, a plurality of gravity fed, free falling molds containing a polymerizable or curable composition in the mold cavity; mold feeding means associated with said polymerization column, said mold feeding means being a rotatable mold-dispensing magazine adapted for containing a plurality of molds and disposed such that the longitudinal axis of said mold-dispensing magazine forms an acute angle $\alpha$ with the longitudinal axis of the polymerization column; and the exit end of said mold-dispensing magazine being disposed proximal to (including communication with) the inlet end of the polymerization column, the said acute angle $\alpha$ and the speed of rotation of said mold-dispensing magazine being sufficient to enable the molds to be released from the magazine one at a time and gravity fed in the same manner into the inlet end of said polymerization column. Acute angle $\zeta$ generally does not exceed about 50 degrees and can be as small as 10 degrees, or smaller, a primary criteria being that during rotation of the mold-dispensing column the molds contained therein are released, one at a time, and gravity fed into the inlet end of the polymerization column.

In a preferred embodiment the dispensing end of the mold dispensing magazine bears against the receiving or inlet end of the polymerization column such that the rotation of the column about its longitudinal axis is imparted to and causes the mold-dispensing magazine column to rotate about its longitudinal axis without resorting to additional rotating means.

In the fabrication of contact lenses, the novel device is provided with gas feed means for introducing, into the lower end of the polymerization column, a gaseous medium which is caused to flow upwardly against the gravity fed molds which are separately descending, one at a time, into the column. In the spin casting of contact lenses utilizing ethylenically unsaturated monomers(s) it is necessary to remove any entrained oxygen from the polymerization column, especially oxygen entrained above the surface of the monomer(s) contained in the cavity of the mold, in view of the well-recognized inhibiting effect of oxygen on the rate of polymerization of such monomer(s). An inert gas such as nitrogen or argon is used for this purpose and accordingly the polymerization reaction proceeds under such an inert gaseous atmosphere. Heretofore, in the gravity fed, free falling vertical loading of the polymerization column with a series of molds each of which contained the polymerizable monomer(s) in the mold cavity thereof, it was observed that the molds entered the vertical polymerization column in tight mold clusters or stacks. Oxygen, therefore, was able to become entrapped above the surface of the monomer(s) in the mold cavities of such tight mold clusters. In this entrapped state the oxygen was not readily available to be flushed and purged from the column by the gently upwardly-flowing inert gaseous medium. The inhibiting effect of the entrained oxygen caused an uneven rate of polymerization and resulted in contact lens products which were unacceptable in quality or which failed to meet predetermined specifications.

In the practice of one aspect of the invention the undesirable tight mold cluster effect and its attendant disadvantages are avoided. The acute angle α (the angle formed by the longitudinal axis of the mold dispensing magazine and the polymerization column—see FIG. 1) and the speed of rotation of the mold dispensing magazine are adjusted so that the molds "peel off", one at a time, while rotating about their vertical axis. In this rotating state the (molds) emerge from the dispensing magazine, one at a time, and are gravity fed into the inlet end of the polymerization column, one at a time, against the upwardly-flowing inert gas, e.g., nitrogen. Any oxygen present above the surface of the monomer(s) in the mold cavity is thus flushed and swept out by the upwardly flowing nitrogen and purged from the column. The nitrogen gas can flow upwardly through the annular space formed by the interior wall of the column and the peripheral wall of the molds, or the interior wall of the column and/or peripheral wall of the molds can be provided with vertical grooves or channels or other means for channeling the inert gas throughout the column. In general, the acute angle α can vary from approximately 10 degrees to about 50 degrees using rotational speeds of upwards to 600 rpm (revolutions per minute) especially since a suitable speed of rotation of the polymerization column is from 300 to about 600 rmp. Adjusting the speed of rotation of the mold dispensing magazine (loaded with a tight stack of molds) and the acute angle in order to cause the molds to individually "peel off" and emerge, one at a time, from the dispensing end of the magazine, can be readily determined by the artisan from the teachings in this disclosure. It is understood therefore that he acute angle α and the speed of rotation of the magazine can be effected outside the above illustrated ranges.

Therefore, in one aspect the invention relates to a method for producing shaped articles which comprises:

(a) rotating an elongated tubular zone about its longitudinal or vertical axis, at least a portion of which comprises an elongated tubular polymerization zone, said elongated tubular zone being maintained under an inert atmosphere and containing a plurality of vertically arranged molds each containing a fluid polymerizable or curable material in the mold cavity thereof;

(b) said elongated tubular zone being rotated at a speed sufficient to cause and/or maintain the radially outward displacement of said fluid polymerizable or curable material in the cavity of the molds thereby assuming a predetermined configuration;

(c) maintaining the elongated polymerization zone under polymerizable conditions to convert said fluid polymerizable or curable material of predetermined configuration into the predetermined shaped solid article; and (d) withdrawing each of said molds from said elongated tubular zone after at least the fluid polymerizable or curable material is formed into the predetermined shaped solid article;

the improvement which comprises positioning an elongated mold dispensing zone (tube) such that its longitudinal axis and the longitudinal axis of the said elongated tubular zone forms an acute angle α generally less than 50° (see FIG. 1); said dispensing tube containing a plurality of molds which contain fluid polymerizable or curable material in the mold cavities thereof; causing said molds to be individually released in a rotatable manner from the dispensing outlet of said dispensing tube and introduced, one at a time, into the inlet end of said elongated polymerization tube and downwardly therein in a free fall or gravity fed manner against an upwardly flowing inert gaseous medium thereby effectively purging entrained oxygen (or other gaseous obstacles) from the elongated tube especially above the surface of the polymerizable material in the mold cavity, as discussed previously.

Any fluid polymerizable, curable or moldable reactant or mixture with/without an inert or reactive solvent which is/are capable of being displaced outwardly due to the rotation of the column, i.e., by the resultant centrifugal forces, can be employed in the practice of the invention. The medium comprising the reactant(s) constitute a homogeneous liquid and is capable of forming a desired shaped article during the centrifugal casting operation. The article may be opaque, transluent or transparent depending onto the ultimate use of the cast article formed. For instance, it is not generally a necessity that diaphragms and artificial heart valve substitutes obtained by the practice of the invention be colorless and transparent. On the other hand, for example, it is a requirement that soft hydrophilic contact lenses be fully transparent, of good optical quality, soft and resilient as well as possessing other necessary and desirable characteristics.

In particular, the novel automatic feed device and novel process can be utilized in the manufacture of a wide variety of contact lenses which can be symmetrical or asymmetrical; hard, flexible or soft; water absorptive or non-water absorptive; low, medium, or high oxygen permeability or transportability; and the like. By choosing suitably designed mold cavities or bottoms there can be obtained a wide variety of modified lens shapes, e.g., toric, bifocal, truncated and/or ballasted contact lenses. A wide variety of materials or construction can be employed to fabricate the molds; see, for example, U.S. Pat. No. 3,660,545. For the preparation of hydrophilic articles such as soft contact lenses a mold fabricated of polypropylene is suitable. To insure proper wetting of the optical surface of the mold by the lens-forming mixture it is desirable to first pretreat or hydrophilize the said surface by known methods.

The liquid lens-forming mixture can comprise monomer, prepolymer or vulcanizable components. Particular suitable components are hydrophilic monomers preferably including those which form slightly or moderately crosslinked, three dimensional networks such as those disclosed in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinyl pyrrolidones, e.g., methyl substituted N-vinylpyrrolidone; glycidyl methacrylate; glycidyl acrylate, the unsaturated amines; the alkyl ethyl acrylates; solubilized collagen; mixtures thereof; and others known to the art.

Hydrophilic monomers particularly useful in the practice of the invention to manufacture contact lenses include hydrophobic acrylic esters, suitably lower alkyl acrylic esters, preferably wherein the alkyl moiety contains 1-5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or mixtures thereof.

Other suitable monomers include the ethylenically unsaturated monocarboxylic acid esters, in particular, the methacrylic and acrylic acid esters of siloxane monomers and polymers with/without a pendant hydroxyl group. These monomers are well documented in the contact lens art; see, for example, U.S. Pat. Nos. 4,139,548; 4,235,985, 4,152,508; 3,808,178; 4,139,692; 4,248,989; and 4,139,513. The disclosure of the foregoing illustrative patents, to the extent intended herein, are incorporated by reference as if set out in full text.

Among the preferred monomeric mixtures are those which contain at least one alkylene glycol monoester of methacrylic acid, especially ethylene glycol monomethacrylate, and at least one crosslinking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, glycidyl methacrylate, N-methylacrylamide, diethylene glycol monomethacrylate, and others illustrated above.

The above illustrated monomers, monomeric mixtures including mixtures of hydrophobic and hydrophilic reactants, may be further admixed with a minor proportion of di- or polyfunctional polymerizable species to cause crosslinking of the polymeric matrix as polymerization or curing proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other crosslinking monomers can be illustrated by N,N-methylene-bis-acrylamide or methacrylamide, sulfonated divinylbenzene, and divinylsulfone.

Additional lens-forming materials which are suitable in the fabrication of contact lenses are illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086; and 4,062,627.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent comprises a minor amount of the reaction medium, i.e., less than about 50 weight percent.

Polymerization of the lens-forming mixture may be carried out with free radical catalysts and/or initiators of the type in common use in vinyl polymerization. Such catalyst species can include the organic peroxides, the alkyl percarbonates, hydrogen peroxide, and inorganic materials such as ammonium, sodium, or potassium persulfate.

Polymerization of the monomer or prepolymer material can also be effected using, for example, radiation (U.V., X-ray, microwave, or other well-known forms of radiation) with/without the presence of well-known initiator(s) and/or catalyst(s).

It is pointed out that the word "tube" in this specification is used in generic sense and includes any column suitable for the purposes intended herein.

The shape of a lens blank may be controlled not only by the size and shape of the mold cavity, but also by the amount and nature of the components comprising the lens-forming mixture, by the rotational speed of the polymerization tube (and molds) during polymerization, by the position of the axis of rotation of said tube and molds relative to the direction of gravity, by axis of rotation of said tube relative to the optical axis of the (formed) lens in the mold cavity, and the like. Tilting the axis of rotation or when the axis of rotation does not pass through the optical center of the (forming) lens, a prism component can be added to the lens.

In the fabrication of contact lenses by one embodiment of the invention, the molds each of which contain the lens-forming material in the mold cavity having an optical concave surface wetted by said material and then gravity fed, one at a time, into the inlet end of a rotating elongated tube which desirably comprises a "conditioning" zone near the inlet end and a polymerization reaction zone toward the outlet end. It is preferred that the molds be characterized by a pretreated optical surface to increase its hydrophilicity or wettability in a manner well-known in the art. The speed of rotation of the tube and the molds, secured in interference fitting relationship, is adjusted to cause and/or maintain radially outward displacement of the lens-forming mixture to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of catalyst, initiator, and/or radiation energy source, and factors discussed previously and readily apparent to the artisan.

BRIEF DESCRIPTION OF DRAWING

The present invention will become more apparent from the following description thereof when considered together with the accompanying drawing which is set forth as being exemplary of embodiments of the present invention and is not intended in any way to be limited thereof and wherein:

FIG. 1 is a semi-schematic view partly in cross-section of a polymerization column and feed means of this invention.

FIG. 2 is a perspective view of a mold for use in this invention.

DETAILED DESCRIPTION OF DRAWING

Referring in detail to FIG. 1, there is shown a rotatable polymerization column 2 comprising a polymerization tube 4 having a conditioning tube 6 coaxially mounted above polymerization tube 4 and coupled together using a conventional bearing 8. To maintain polymerization column 2 in a vertical position, the inlet end 10 is mounted in a conventional bearing (not shown). A conventional variable speed motor 14 drives wheel 18 which in turn rotates polymerization tube 4 and conditioning tube 6 via bearing 8. Disposed above support member 15 is mold-dispensing magazine 20 containing a plurality of molds 22 each of which contain a metered amount of a polymerizable or curable composition in the mold cavity. A typical type mold 22, suitable for use in this invention, is shown in FIG. 2 having a mold cavity 32, circular horizontal mold shoulder 9 located between inner mold wall 7 and mold cavity 32, and cylindrical wall 11.

As shown in FIG. 1, mold-dispensing magazine 20 is supported in a bearing 13 which permits the mold-dispensing magazine 20 to freely rotate about its longitudinal axis 21. The outlet rim 17 which is shown slightly tapered, rests against the inlet rim 19 of conditioning tube 6 so that when the variable speed motor 14 drives the polymerization tube 4 and conditioning tube 6, the frictional contact made between the outlet rim 17 of the mold-dispensing magazine 20 and the inlet rim 19 of the conditioning tube 6 will cause the mold-dispensing magazine 20 to rotate at a speed proportional to the speed of rotation as that of the overall polymerization column 2, preferably at a speed lower than the speed of the polymerization column 2. Alternatively, a separate conventional variable speed motor could be used to drive the mold-dispensing magazine 20 at a speed proportional to the speed of the polymerization column 2. When a separate motor means is used to rotate the mold-dispensing magazine 20, then it would not be necessary to have the outlet rim 17 of the mold-dispensing magazine 20 in physical contact with the inlet rim 19 of the conditioning tube 6. All that would be necessary is that the outlet end 17 of the mold-dispensing magazine 20 be disposed proximal to the inlet end 10 of conditioning tube 4 so that molds 22 exiting from the mold-dispensing magazine 20 one at a time can be gravity fed into and through conditioning tube 6 one at a time for proper alignment within polymerization tube 4.

The variable speed motor 14 is used to rotate the polymerization tube 4 and the conditioning tube 6 via a bearing 8 at a speed sufficient not only to insure that the polymerizable or curable composition conforms to the surface of the cavities in molds 22, but also to form an upper surface contour on the polymerizable or curable composition so that the end product produced after the polymerization process is completed will be a product having an overall configuration within a desired specification. This is of particular importance in the production of soft contact lenses in which their overall configuration has to be within close specification tolerances. Thus the speed of rotation for the polymerization column 2 in the production of soft contact lenses could be in the range of, for example, about 300 to about 600 revolutions per minute to produce soft lenses having a desired shape.

Conventional gas feed means are shown coupled at the lower portion of the polymerization tube 4 to direct a gaseous medium, such as a inert gaseous medium of argon or nitrogen, up through the rotating polymerization tube 4 and rotating conditioning tube 6. Specifically, the rotatable polymerization column 2 is secured in frictional contact within a rotatable ring 34 attached to a inner rotatable racer 36 of bearing 38. The outer racer 40 of bearing 38 is mounted on a fixed tubular support member 42. The feed assembly is operable such that polymerization column 2 can rotate within support member 42 via bearing 38. An air inlet opening 44 is defined in and through the wall of support member 42 and is in communication with an inner annular groove 46 defined in the inner wall of support member 42. If desired, vertical grooves can be circumferentially spaced about the inner wall of support member 42 commencing with the groove 46 and extending up to the top so as to provide channels for the gas to be fed into the interior of polymerization column 2. The inner diameter of support ring 42 can be substantially equal to the outer diameter of the mold 22 so that when molds 22 are disposed below groove 46, the gas fed through air inlet opening 44 will be blocked from escaping out the bottom of this support ring 42 and instead will be directed up through the grooves or channels in the upper section of the inner wall of support ring 42 and into and through polymerization column 2. In a like manner, polymerization column 2 can the fabrication with vertical groove to permit a more unobstructed path for the gas to ascend through the polymerization column 2 and purge any undesirable air entrained within said column 2. In addition, with the mold-dispensing magazine 20 disposed at an acute angle with polymerization column 2, the gas can freely escape out the top of polymerization column 2 and carry along with it any undesirable gas from within polymerization column 2. If desired, a conventional drive wheel and motor means could be employed to rotate ring 34 which in turn would rotate polymerization column 2. In this embodiment, motor means 14 would not be necessary. Undesirable air entrained within the polymerization should be purged, especially oxygen above the surface of the polymerizable material in mold cavity 32. This is essential in the production of soft contact lenses since any such entrained air can inhibit the polymerization process and result in products of acceptable quality. By directing a feed of inert gas, such as nitrogen, up through the polymerization tube 4 and the conditioning tube 6, any entrained air would be purged out through the inlet opening 10 thus providing an inert environment for the polymerization process to occur in the polymerization tube 4. Devices employing mold-dispensing magazines in vertical alignment with the polymerization column cause clusters or stacks of molds, each containing a metered amount of a polymerizable or curable composition, to be dropped into the polymerization column where it would be extremely difficult to purge any entrapped air in the space above the surface of the polymerizable material in the individual mold cavity. By disposing mold-dispensing magazine 20 at an angle α formed between the longitudinal axis 21 of mold-dispensing magazine 20 and longitudinal axis 23 of polymerization column 2, and then rotating the mold-dispensing magazine 20 at a desirable speed to impart a circular rotation to each of the molds (containing polymerizable material in the mold cavity) within the magazine 20, the molds 22 will be ejected or "peel off" one at a time from the magazine 20 and gravity fed one at a time into and through conditioning tube 6 for vertical alignment within polymerization tube 4. At discharge end 24 of polymerization tube 4, the exiting molds 22 descend and are supported on platform 26. As shown in FIG. 1, a conventional driver means 28 operated by hydraulic, pneumatic or similar means, has a reciprocating pusher arm 30 with a height approximately equal to or slightly less than the height of mold 22. The pusher arm 30, preferably terminating with a semi-circular configuration or spaced apart fingers so as to partly encircle the exited mold 22, advances mold 22 to a receptacle 35 for collection. By having the height of pusher arm 30 equal to or slightly less than the height of a mold 22, the pusher arm 30 upon advancing mold 22 will be able to support and maintain the mold immediately above said advancing mold within the polymerization tube. After the pusher arm 30 is returned to its fully retracted position, the mold supported by pusher arm 30 will descend unto platform 26.

In the operational mode, the longitudinal axis 21 of mold-dispensing magazine is dispensed at an angle α of between 10° and 50°, with the longitudinal axis 23 of polymerization column 2. The inlet rim 17 of magazine 20 rests upon inlet rim 19 of conditioning tube 6 so that when the polymerization tube 2 is rotated by motor 14, mold-dispensing magazine 20 will be rotated through frictional contact between rims 17 and 19. As stated above, the speed of rotation should be sufficient to part a centrifugal force that will not only cause the polymerizable or curable composition to conform to the surface of the cavity, but also to cause the upper surface of the composition to form into a predetermined contour in accordance with a particular specification requirement. The rotation of the mold-dispensing magazine 20 will impart a rotation or circular motion to the molds 22 contained therein and thus cause each of the molds 22 containing a metered amount of polymerizable or curable composition to descend in a circular type fashion where they will then be ejected or "peel off" one at a time and gravity fed one at a time into the inlet end 10 of polymerization column 2. Molds 22 continue their gravity descent through rotating conditioning tube 6 and are then vertically aligned within rotating polymerization tube 4 where the polymerization process occurs. At the completion of the polymerization process, the composition in the mold is formed into a desired overall configuration whereupon the mold exits at discharge end 24 of the polymerization tube 4 onto platform 26. Driver means 28 extends pusher arm 30 which advances the exited mold 22 containing the finished product into a receptacle 35 for collection while supporting the next mold 22 to be discharged from polymerization tube 4. Pusher arm 30 is then retracted so that the mold supported by pusher arm 30 falls on platform 26 whereupon the pusher arm 30 is once again in position to advance said mold on platform 26 into receptacle 34. This process is repeated at predetermined intervals thereby providing a device for automatically and continuously producing products such as soft contact lenses.

EXAMPLE 1

Polypropylene molds (FIG. 2) having a concave spherical optical surface in the mold cavity can be used in the centrifugal casting of contact lens. The mold dimensions are: outside diameter—17 mm; inner diameter above mold cavity—15.6 mm; height of mold—7.5 mm; diameter of mold cavity—13.2 mm; central mold cavity radius—7.7 mm; depth of mold cavity (max.)—3.3 mm; width of circular horizontal mold shoulder (located between the inner mold wall and mold cavity)—1.2 mm. The hydrophilicity or wettability of the optical surface of the molds can be enhanced by treatment in an oxygen, low temperature, plasma chamber for approximately 18 seconds, 50 watts gauge setting (Model LTA-302, Low Temperature Asher, LFE Corporation, Waltham, Mass). To a series of these molds, there can be charged, individually, a metered amount of the lens-forming mixture, i.e., approximately 20 milligrams. The lens-forming mixture (based on total weight) could comprise the following recipe:

Components (Parts by Wt.)

2-Hydroxyethyl Methacrylate: 84.6
Ethylene Glycol Dimethacrylate: 1.0
Benzoin Methyl Ether (initiator): 0.2
Glycerol: 14.2

As shown in FIG. 1, charge molds, approximately 60, contained in a rotating tubular magazine 20 are gravity fed, one at a time, into the inlet end of a rotating Pyrex column which has a circular cross sectional view. The longitudinal axis of the tubular magazine and the longitudinal axis of the Pyrex column forms an angel of about 30 degrees. The rotating molds are allowed to free fall downwardly, one at a time, into the column. The column is supported in an upright position (substantially perpendicular to the ground) and the molds rotate in a plane which is substantially perpendicular to the longitudinal or spinning axis of the column. The capacity of the column can very, for instance, from 60 to 120 molds. The speed of rotation of the Pyrex column about its vertical axis is 400 r.p.m. and imparts to the tubular magazine which bears against it a speed of rotation, e.g. 100 r.p.m.. This can be accomplished by gear means or the like. The total residence time of each mold in the column is about 20 minutes. The rotating column is maintained at ambient room temperature, i.e., about 20°-22° C., with nitrogen continually flowing upward in channel 28 to remove entrained oxygen in the column and, in particular, entrained oxygen above the surface of lens-forming mixture in the cavity of the separately descending rotating molds. In the so-called "conditioning" zone in the upper portion of the column, centrifugal forces created by the column rotation cause the radially outward displacement of the liquid lens-forming mixture in the spherical mold cavity to form a predetermined lens shape. The "conditioning" of said liquid material is maintained for a period of abut 15 minutes in its downward decent in the conditioning zone to the polymerization zone. The polymerization zone of the column is likewise maintained at ambient room temperature. The polymerization reaction is conducted using UV radiation from a source outside the column (UV source: medium pressure, mercury arc, UV emission—300-400 nm, infrared is filtered, and lamp distance is 3 inches). The residence time in the polymerization zone is 5 minutes. A longer residence period can be employed, if desired, as well as subjecting the shaped contact lens blank still in the cavity of the mold to post-cure conditions. Immersion in distilled water causes the hydrophilic lens blank to swell which (swelling) causes the separation of the contact lens from the mold. Repeated washings in distilled water insures removal of catalyst or initiator residue and unreacted monomer(s). The contact lens is finally immersed in physiologic solution (0.9% saline) until it reaches osmotic equilibrium with the solution.

The finished lens has a refractive power (wet) of −6 diopters. It is optically clear, transparent, inert to bacteria, biocompatible with the cornea, water content of about 30% by weight, dimensionally stable, and exhibits good mechanical properties. It is useful as a daily wear "soft" contact lens.

EXAMPLE 2

The procedure of Example 1 is repeated using the following recipe:

Components (Parts by Wt.)

2-Hydroxyethyl Methacrylate: 78
Ethylene Glycol Dimethacrylate: 2
Benzoin Methyl Ether (initiator): 0.4
Glycerol: 19
Ethylene Glycol Dimethacrylate: 1.0 (No UV source)
Polymerization Zone Conditions: 70° C.;
residence time: 6 minutes.

There is obtained a contact lens that is optically clear, transparent, inert to bacteria, biocompatible with living tissue, highly water-swellable, water-insoluble, dimensionally stable, and of good mechanical strength.

EXAMPLE 3

The procedure of Example 1 is repeated using the following recipe:

Components (Parts by Wt.)

2-Hydroxyethyl Methacrylate: 95
Ethylene Glycol Dimethacrylate: 5
Benzoin Methyl Ether (initiator): 0.2
Glycerol: 10
Ethylene Glycol Dimethacrylate: 0.5 (No UV source)
Polymerization Zone Conditions: 70° C.;
residence time: 6 minutes.

There is obtained a contact lens that is optically clear, transparent, inert to bacteria, biocompatible with living tissue, highly water-swellable, water-insoluble, dimensionally stable, and of good mechanical strength.

Modifications of the mold cavity and of the recipe results in a wide variety of useful and suitable contact lenses as taught in U.S. Pat. No. 3,660,545, the full disclosure of which is incorporated by reference as if set out in full text.

We claim:

1. A device for casting articles comprising a rotatale polymerization column having an inlet end and an outlet end, said polymerization column adapted for rotation about a vertical axis and adapted for receiving a plurality of gravity fed, free falling molds containing a polymerizable or curable composition; mold feeding means associated with said polymerization column, said mold feeding means being a rotatable mold-dispensing magazine having an inlet end and an outlet end and adapted for containing a plurality of molds and disposed such that the longitudinal axis of said mold-dispensing magazine forms an acute angle $\alpha$ with the longitudinal axis of the polymerization column and wherein the outlet end of said mold-dispensing magazine is disposed at the inlet end of the polymerization column and operable such that the speed of rotation of said mold-dispensing magazine is sufficient so as to impart circular rotation to the molds to enable the molds to be discharged one at a time from the outlet end of the magazine and gravity fed one at a time into the inlet end of said polymerization column.

2. The device of claim 1 wherein gas feeding means are coupled to the polymerization column so as to direct an inert gaseous medium up through the polymerization column.

3. The device of claim 1 wherein said polymerization column comprises a polymerization tube coaxially mounted below a conditioning tube and secured so that said polymerization tube and said conditioning tube are adapted to rotate at the same speed.

4. The device of claim 1 wherein said polymerization column is a polymerization tube.

5. The device of claim 1 wherein at least a segment of the outlet end of the mold-dispensing magazine rests against and makes contact with at least a segment of the inlet end of the polymerization column so that rotation of the polymerization column will cause rotation of the mold-dispensing magazine.

6. The device of claim 2 wherein at least a segment of the outlet end of the mold-dispensing magazine rests against and makes contact with at least a segment of the inlet end of the polymerization column so that rotation of the polymerization column will cause rotation of the mold-dispensing magazine.

7. The device of claim 1 wherein the outlet end of the mold-dispensing magazine is spaced slightly apart from the inlet end of the polymerization column.

8. The device of claim 2 wherein the outlet end of the mold-dispensing magazine is spaced slightly apart from the inlet end of the polymerization column.

9. The device of claim 1 wherein discharge means are associated with the outlet end of said polymerization column for advancing ejected molds to a collection station.

10. The device of claim 6 wherein discharge means are associated with the outlet end of said polymerization column for advancing ejected molds to a collection station.

11. In a method for centrifugally casting of shaped articles which comprises:
  (a) rotating a tubular zone about its longitudinal axis, at least a portion of which comprises a polymerization zone, said tubular zone adapted to receive and accommodate a plurality of gravity fed free falling vertically arranged molds;
  (b) gravity feeding into one end of said tubular zone said molds each containing a fluid polymerizable material in the mold cavity;
  (c) maintaining the rotational speed of said tubular zone at a speed sufficient to cause the radially outward displacement of said fluid polymerizable material in the cavity of each mold;
  (d) maintaining said polymerization zone under polymerizable conditions to convert said fluid polymerizable material into a shaped solid article; and
  (e) withdrawing said molds containing the solid article from an outlet end of said tubular zone:
the improvement which comprises positioning an elongated mold dispensing zone such that its longitudinal axis and the longitudinal axis of the said tubular zone form an acute angle of less than about 50 degrees; said mold dispensing zone accommodating a plurality of aligned molds each containing fluid polymerizable material in the mold cavity; causing said mold dispensing zone to rotate at a speed sufficient to cause said molds to be individually released in a rotatable manner from the dispensing outlet of said mold dispensing zone and introduced, one at a time, into the inlet end of said tubular zone against an upwardly flowing inert gaseous medium thereby effectively purging any entrained oxygen in contact with the surface of said polymerizable material.

12. The method of claim 11 wherein said polymerizable material is a lens-forming mixture and wherein said shaped solid article is a contact lens.

13. The method of claim 12 wherein the rotation of each mold in said tubular zone is effected in a plane which is substantially perpendicular to its longitudinal axis.

14. The method of claim 13 where said lens-forming mixture comprises a monoester of an acrylic or methacrylic acid and an alcohol having an esterifible hydroxyl group and at least one additional hydroxyl group.

15. The method of claim 14 wherein said lens-forming mixture comprises 2-hydroxyethyl methacrylate.

* * * * *